US011115690B2

(12) United States Patent
Elliott et al.

(10) Patent No.: US 11,115,690 B2
(45) Date of Patent: Sep. 7, 2021

(54) SYSTEMS AND METHODS FOR VIDEO DELIVERY BASED UPON SACCADIC EYE MOTION

(71) Applicant: CABLE TELEVISION LABORATORIES, INC., Louisville, CO (US)

(72) Inventors: Isaac Elliott, Broomfield, CO (US); Steve Glennon, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/167,123

(22) Filed: Oct. 22, 2018

(65) Prior Publication Data

US 2019/0058905 A1 Feb. 21, 2019

Related U.S. Application Data

(63) Continuation of application No. 15/419,858, filed on Jan. 30, 2017, now Pat. No. 10,110,935.

(60) Provisional application No. 62/288,538, filed on Jan. 29, 2016.

(51) Int. Cl.
| | |
|---|---|
| *H04N 21/2343* | (2011.01) |
| *H04N 21/2747* | (2011.01) |
| *H04N 21/81* | (2011.01) |
| *H04N 21/442* | (2011.01) |
| *H04N 21/24* | (2011.01) |
| *H04N 21/647* | (2011.01) |
| *G06K 9/00* | (2006.01) |

(Continued)

(52) U.S. Cl.
CPC ... *H04N 21/234345* (2013.01); *G06K 9/0061* (2013.01); *G06K 9/00604* (2013.01); *H04N 21/234363* (2013.01); *H04N 21/2402* (2013.01); *H04N 21/2747* (2013.01); *H04N 21/4223* (2013.01); *H04N 21/42201* (2013.01); *H04N 21/44218* (2013.01); *H04N 21/64738* (2013.01); *H04N 21/816* (2013.01)

(58) Field of Classification Search
None
See application file for complete search history.

(56) References Cited

U.S. PATENT DOCUMENTS

| | | |
|---|---|---|
| 6,028,608 A | 2/2000 | Jenkins |
| 6,351,335 B1 | 2/2002 | Perlin |

(Continued)

*Primary Examiner* — Alexander Q Huerta
(74) *Attorney, Agent, or Firm* — PdZ Patent Law, PLLC

(57) ABSTRACT

A method is provided for displaying an immersive video content according to eye movement of a viewer includes the steps of detecting, using an eye tracking device, a field of view of at least one eye of the viewer, transmitting eye tracking coordinates from the detected field of view to an eye tracking processor, identifying a region on a video display corresponding to the transmitted eye tracking processor, adapting the immersive video content from a video storage device at a first resolution for a first portion of the immersive video content and a second resolution for a second portion of the immersive video content, the first resolution being higher than the second resolution, displaying the first portion of the immersive video content on the video display within a zone, and displaying the second portion of the immersive video content on the video display outside of the zone.

19 Claims, 2 Drawing Sheets

(51) Int. Cl.
   *H04N 21/422*     (2011.01)
   *H04N 21/4223*    (2011.01)

(56) References Cited

U.S. PATENT DOCUMENTS

| | | | | |
|---|---|---|---|---|
| 7,027,655 | B2* | 4/2006 | Keeney | H04N 19/115 |
| | | | | 375/E7.182 |
| 7,950,029 | B2 | 5/2011 | Andreyko et al. | |
| 9,665,171 | B1* | 5/2017 | Skogo | G06F 3/013 |
| 9,723,199 | B1 | 8/2017 | Goyal et al. | |
| 10,082,870 | B2* | 9/2018 | Thunstrom | G09G 5/37 |
| 10,545,338 | B2* | 1/2020 | Stafford | A63F 13/212 |
| 2006/0143668 | A1* | 6/2006 | Du Breuil | H04N 21/2221 |
| | | | | 725/89 |
| 2008/0111833 | A1 | 5/2008 | Thorn et al. | |
| 2009/0238378 | A1* | 9/2009 | Kikinis | H04N 13/398 |
| | | | | 381/92 |
| 2010/0283972 | A1 | 11/2010 | Plant et al. | |
| 2014/0268054 | A1* | 9/2014 | Olsson | G06K 9/00604 |
| | | | | 351/209 |
| 2015/0078459 | A1* | 3/2015 | McCuller | H04N 19/127 |
| | | | | 375/240.25 |
| 2015/0205126 | A1 | 7/2015 | Schowengerdt | |
| 2015/0264299 | A1* | 9/2015 | Leech | G06F 3/013 |
| | | | | 348/78 |
| 2015/0279418 | A1* | 10/2015 | Laksono | H04N 21/44204 |
| | | | | 386/248 |
| 2015/0288996 | A1* | 10/2015 | van der Schaar | H04N 21/6587 |
| | | | | 725/116 |
| 2016/0328884 | A1* | 11/2016 | Schowengerdt | G02B 6/32 |
| 2017/0011492 | A1 | 1/2017 | Thunström et al. | |
| 2017/0068312 | A1 | 3/2017 | Mallinson | |
| 2017/0090562 | A1* | 3/2017 | Gustafsson | G02B 27/0093 |
| 2017/0169602 | A1* | 6/2017 | Blackmon | G06T 15/005 |
| 2017/0285736 | A1* | 10/2017 | Young | G06F 3/013 |
| 2018/0136722 | A1* | 5/2018 | Mallinson | G06F 3/013 |

\* cited by examiner

SYSTEMS AND METHODS FOR VIDEO DELIVERY BASED UPON SACCADIC EYE MOTION

CROSS REFERENCE TO RELATED APPLICATIONS

This application is a continuation of U.S. patent application Ser. No. 15/419,858, filed Jan. 30, 2017, which application claims the benefit of and priority to U.S. Provisional Patent Application Ser. No. 62/288,538, filed Jan. 29, 2016, which applications are incorporated herein by reference in their entirety.

BACKGROUND

The field of the disclosure relates generally to video delivery over an electronic network, and more particularly, to video delivery based upon saccadic eye motion.

Immersive video, or virtual reality video, is video content that includes some or all of a panorama, and when viewed through a head-mounted display or within surrounding screens, includes some or all of a 360 degree panorama in the horizontal and/or vertical directions. Some conventional immersive video systems include an immersive screen and a video storage source. Immersive video delivered to the immersive screen from the video storage source that is in the same location as the immersive screen, or from a remote location that requires the delivery of the video over a network. In these conventional systems, immersive video must be transferred from a source to a screen. This transfer consumes resources between the video source and the screen, and creates demands on the computing resources that host the video storage and the video screen, and on all elements/devices therebetween. Consumption of such resources increases costs, and may further limit the quality of the delivered video content to the consumer.

BRIEF SUMMARY

In an embodiment, a method is provided for displaying an immersive video content according to eye movement of a viewer. The method includes steps of detecting, using an eye tracking device, a field of view of at least one eye of the viewer, transmitting eye tracking coordinates from the detected field of view to an eye tracking processor, identifying a region on a video display corresponding to the transmitted eye tracking processor, adapting the immersive video content from a video storage device-at a first resolution for a first portion of the immersive video content and a second resolution for a second portion of the immersive video content, the first resolution being higher than the second resolution, displaying the first portion of the immersive video content on the video display within a zone, and displaying the second portion of the immersive video content on the video display outside of the zone occupied by the first portion of the immersive content.

In an embodiment, a system for delivering immersive content to a viewer over an electronic network includes a video display system configured to display the immersive content to the viewer, a video storage device configured to store the immersive content, and communicatively coupled with the video display system over the network, and an eye tracking device disposed proximate at least one eye of the viewer and configured to track a focus of the at least one eye. The eye tracking device is communicatively coupled with a video processing unit, and the video processing unit is configured to adapt and transfer a portion of the immersive content to the video display system based at least in part on a tracked focus of the at least one eye data measured by the eye tracking device.

In an embodiment, a method is provided for generating an immersive video content over a network for a viewer. The immersive content includes a first portion having a first resolution and a second portion having a second resolution lower than the first resolution. The method includes steps of measuring, by a network analyzer, a network quality metric of the network, inputting, to a video processor, a network quality metric and a gaze area value, detecting, by an eye tracking device, a first location of a field of view of at least one eye of the viewer, determining, by the video processor, a size of a first region on a display device to display the first portion of the immersive content, based on at least one of the first location, the network quality metric, and the gaze area value, and processing, by the video processor, the immersive content based on the determined size of the first region to generate the immersive content including the first portion having the first resolution content and the second portion having the second resolution content lower than the first resolution.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
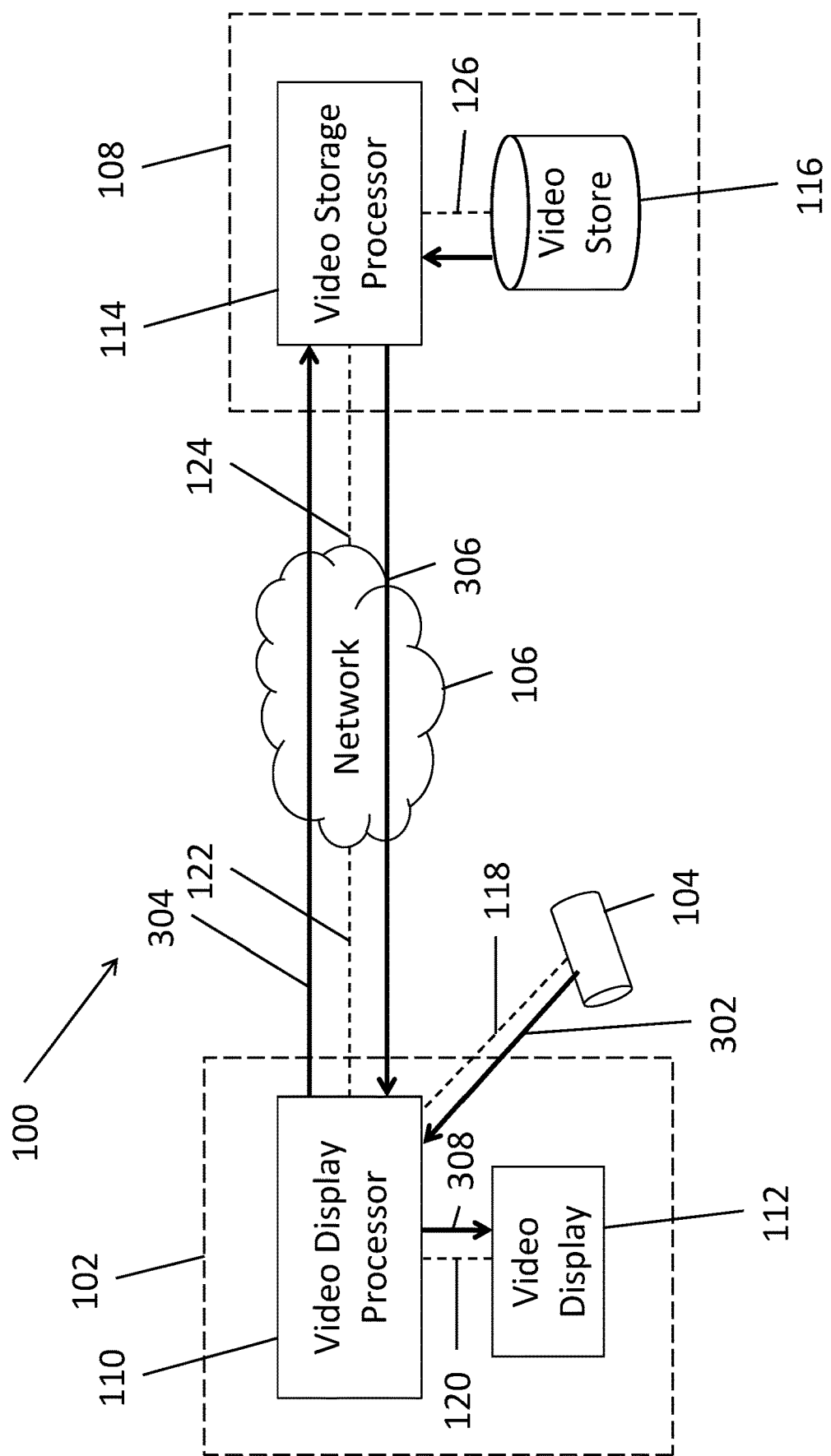
FIG. 1 is a schematic illustration of an exemplary system for delivering immersive video content for a viewer, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments herein describe and illustrate an immersive video system that delivers video, or immersive content, based on saccadic eye motion. Immersive video, or virtual reality, is video that includes some or all of a panorama, and when viewed through a head-mounted display or within surrounding screens, includes some or all of a 360 degree panorama in the horizontal and/or vertical directions. Immersive video delivered to the video display system from the video storage system that is in the same location as the video display system, or from a remote location that requires the delivery of the video over the network. In either case, immersive video must be transferred from a source to a screen. This transfer consumes resources between the video storage system and the video display system, and creates demands on the computing resources that host the video storage system and the video display system, and on all elements in between. Systems and methods according to the embodiments herein are capable of advantageously conserving these resources, thereby creating cost savings for content delivery, as well as better viewer experiences at a lower cost. The present systems and methods are thus further capable of delivering viewer experiences that would otherwise be relatively impossible to deliver on conventional systems.

The embodiments of the immersive video system described herein conserve these resources by tracking the saccadic motion of the eye with the eye tracking video camera. As described further below, an immersive video system includes a video display system, an eye tracking video camera, an electronic network, and a video storage system. The immersive video system provides high quality rendering of the immersive video in the area of the video display system that the eye will be viewing. The immersive video system also provides lower quality rendering of the immersive video in the area of the video display system that the eye will not be viewing. By providing lower quality rendering in areas that the viewer's eye is not directly viewing, the present embodiments are better able to conserve resources by sending predominantly high quality rendering to a field where the viewer's eye will directly view the content.

The biology of the human eye concentrates a very high number of rods and cones in a small area in the center of a focus of each eye, called a foveal area. A diameter of the foveal area is relatively small, and can be limited to a range of approximately two degrees. Human eyes though, have their greatest ability to see detail and color gamut within this relatively small area. Additionally, the foveal area of the human eye is surrounded by a blend area having a range of about ten degrees, and greater diameter, in which the eye has a lower ability to focus and recognize details. Outer to the blend area is a peripheral vision area, where the human eye has a significantly more limited ability to view detail.

Embodiments of the immersive video systems and methods described herein advantageously conserve valuable content delivery resources by delivering higher quality detailed content, i.e., higher resolution, to the field of a display where the human eye is viewing, and lower resolution content to the field where the eye is not most directly viewing (e.g., the blend and peripheral regions). The present embodiments are thus described below with respect to a display that is dedicated to the use of a single viewer. However, a person of ordinary skill in the art, after reading and comprehending the present disclosure, will understand how the present embodiments may be utilized with respect to both eyes of a single viewer or multiple viewers, e.g., through the use of multiple cameras, or a single camera having the ability to track more than one eye at a time. The present systems and methods are configured to track the movement of one or more human eyes to determine where the eye is looking, and accordingly adjust the detail/resolution shown on a video display to deliver higher quality content to the fields of the display where the eye is best able to see detail.

Additionally, the direction of view is not limited to only eye movement, e.g., humans may change their visual field by keeping the head, neck, and body stationary while moving the eyes alone. Humans, however, may also change their visual field by a coordinated movement of the head, neck, or body, in addition to just movement of the eyes. This movement of the eyes alone is referred to as a saccade, or saccadic movement. Saccadic movements of the eyes are also referred to as "stereotyped" and "ballistic" movements. Stereotyped saccades refer to the situation where saccades generally are known to follow a similar pattern to each other. That is, the velocity of the visual field moving by a saccadic motion corresponds to an increase in a similarly stereotyped way. Ballistic saccades refer to the situation where the destination of the movement is predetermined at the beginning of the movement.

Typical saccade movements made toward a target field of view have a mean duration between 150 ms and 250 ms. The mean duration is long enough for embodiments of the immersive video systems and methods described herein to detect a start of a saccade movement, predict the destination of the saccade movement, and react by changing what is being displayed at the target field of view prior to the eye's arrival at the target field of view. As such, embodiments of the immersive video systems and methods described herein predicts where an eye is going to look based upon the very beginning of its motion, well before the field of view has reached the target field of view.

Embodiments of the immersive video systems and methods described herein advantageously adapts the fidelity of displayed content in the target field of view based on predicting where the viewer is about to look. Additionally, embodiments of the immersive video systems and methods described herein adapts the streaming delivery of content to account for the viewer's current field of view, and the viewer's target field of view, in order to reduce the total number of bits that need to be delivered in order to render the scene for the viewer.

FIG. 1 is a schematic illustration of an exemplary system 100 for delivering immersive video content for a viewer (not shown). According to the exemplary embodiment, system 100 is an immersive video content delivery system for displaying content based, at least in part, on saccadic eye movement of the viewer. In the exemplary embodiment, immersive video content includes immersive content, video, virtual reality, and immersive video. System 100 includes a client display device or video display system 102, an eye tracking device or eye tracking video camera 104, an electronic network 106, and a video storage system 108. Video display system 102 includes a video display processor, eye tracking processor, or first processor 110 and a video display 112. Video storage system 108 includes a video storage processor or second processor 114 and a video storage device 116. Electronic network 106 includes one or more of an intra-computer bus, a local area network, an optical network, a hybrid fiber coax network, a wireless network, or a wide area network such as the Internet. In an exemplary embodiment, video display 112 includes one or more of a head-mounted display or a plurality of surrounding screens that includes some or all of a 360 degree panorama in the horizontal and/or vertical directions.

In an embodiment, video display processor 110 and video display 112 are integrated in a single device or video display system 102. In an alternative embodiment, video display processor 110 is separate from video display 112. In another embodiment, video display processor 110, video display 112, and eye tracking video camera 104 are integrated in a single device or video display system 102. In an alternative embodiment, video display system 102, eye tracking video camera 104, electronic network 106, and video storage system 108 are integrated into a single device or immersive video system 100.

In the embodiment illustrated in FIG. 1, eye tracking video camera 104 electronically communicates with video display system 102 by a camera communications link 118. In an example of the embodiment, eye tracking video camera 104 electronically communicates with video display processor 110 by camera communications link 118. Video display 112 electronically communicates with video display processor 110 by a video display communications link 120. Video display system 102 may also communicate with electronic network 106 by a video display processor communications link 122. In an exemplary embodiment, video display processor 110 electronically communicates with electronic network 106 by video display processor communications link 122. Electronic network 106 communicates with video storage system 108 by a network communications link 124. More specifically, electronic network 106 electronically communicates with video storage processor 114 by network communications link 124. Video storage device 116 electronically communicates with video storage processor 114 by a video storage communications link 126.

Figure 2:
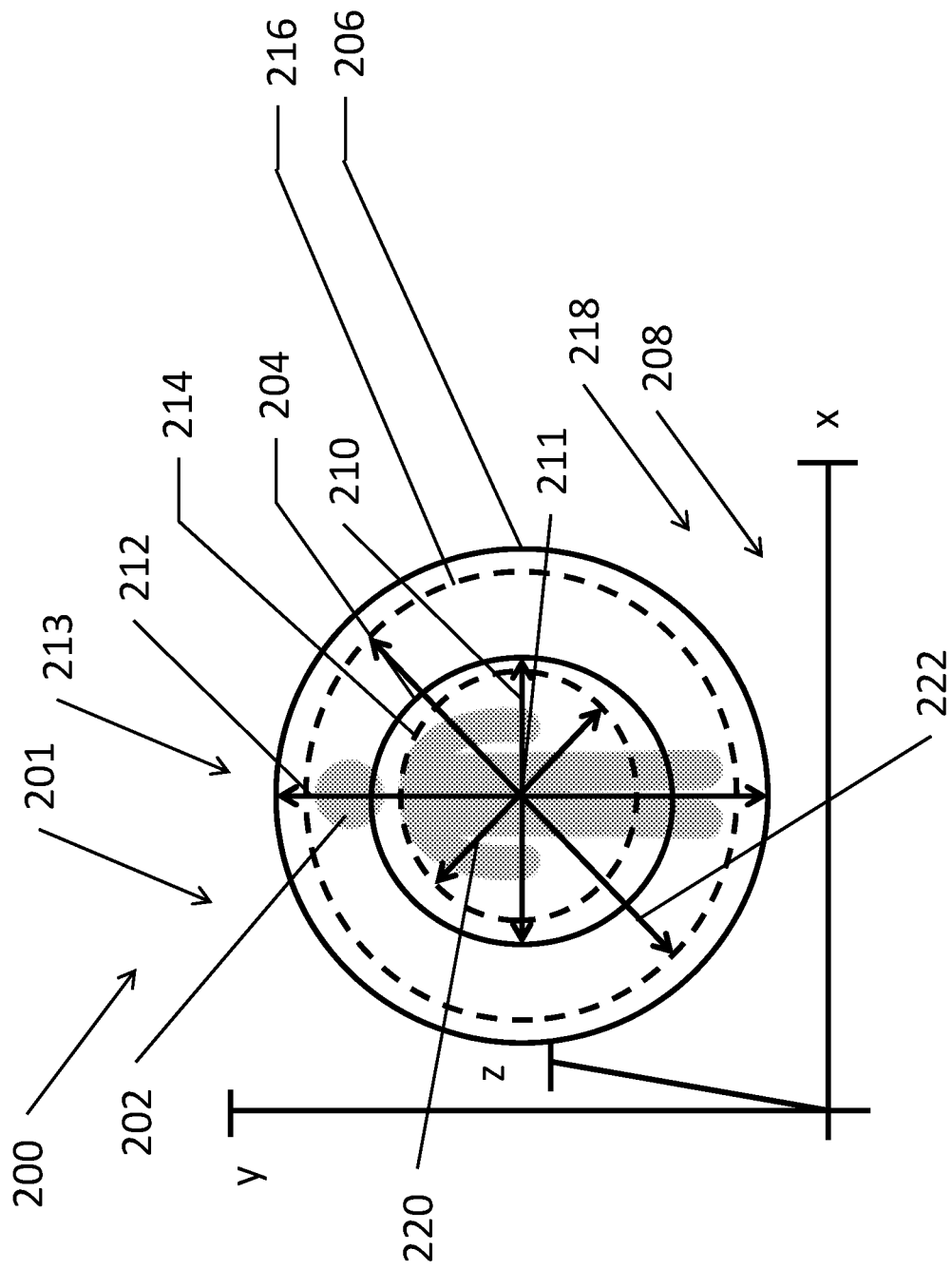
FIG. 2 illustrates an exemplary content layout associating content resolution with a viewer's field of view, in accordance with the system depicted in FIG. 1.

FIG. 2 illustrates an exemplary content layout 200 for associating content resolution with a viewer's field of view, which may be implemented with the system depicted in FIG. 1. Content layout 200 includes a plurality of viewable display regions 201 about an object 202 in layout 200. In the exemplary embodiment, viewable display regions 201 include two or more of a foveal region 204, a blend region 206, and a peripheral region 208. In the exemplary embodiment, the viewer (not shown) is focused on object 202, which is centered within foveal region 204. For purposes of explanation, foveal region 204 represents the region on a display (not numbered) of content layout 200 corresponding the foveal portion of the viewer's eye (containing the relatively higher number of rods and cones) that centers and focuses its gaze on object 202. Foveal region 204 includes a foveal region diameter 210, and is surrounded by blend region 206. Peripheral region 208 surrounds blend region 206. Foveal region 204, blend region 206, and peripheral region 208 are concentrically centered about central point 211. Blend region 206 includes a blend region diameter 212.

Content layout 200 also includes a plurality of display resolution zones 213. Display resolution zones 213 include two or more of a high quality rendering zone 214, a medium quality rendering zone 216, and a low quality rendering zone 218. That is, high quality rendering zone 214 contains relatively higher image resolution than medium quality rendering zone 216, and medium quality rendering zone 216 contains relatively higher image resolution than low quality rendering zone 218. As explained further below, an imaging processor (e.g., video display processor 114, FIG. 1) is configured such that display resolution zones 213 are concentrically centered substantially about central point 211, such that, in an exemplary embodiment, high quality rendering zone 214 substantially overlaps with foveal region 204. In a similar manner, medium quality rendering zone 216 substantially overlaps with blend region 206, and low quality rendering zone 218 substantially overlaps with peripheral region 208.

According to the exemplary embodiment, the different diameters of high quality rendering zone 214, medium quality rendering zone 216, and low quality rendering zone 218 generally correspond, about central point 211, to those of foveal region 204, blend region 206, and peripheral region 208, respectively. Alternatively, the respective diameters of display resolution zones may be larger or smaller than those of the corresponding viewable display regions 201. In the embodiment shown in FIG. 2, high quality rendering zone 214 and medium quality rendering zone 216 are illustrated to be circular regions having a high quality rendering region diameter 220 and a medium quality rendering region diameter 222, respectively. In an alternative embodiment, high quality rendering zone 214 and medium quality rendering zone 216 may have any shape which enables system 100 to operate as described herein, including, without limitation, square and rectangular shapes disposed regularly about central point 211.

In operation, eye tracking video camera 104 is configured to be aimed toward at least one eye (not shown) of the viewer, and to record video at a sufficient frame rate to track movement of the eye, for example, 240 frames per second (fps). At 240 fps, an image frame is received by video display processor 110 approximately every 4 ms. Video display processor 110 is further configured to determine, from the received image frames, the relative position of the field of view within each image frame. Thus, if the field of view of the eye begins to shift from saccadic motion, video display processor 110 is configured to determine velocity, acceleration, and direction of travel of the field of view, and further to predict the destination of the field of view. In exemplary embodiment, the determination of the destination of the field of view can be made based on three frames (or 12 ms of samples) from eye tracking video camera 104. Saccadic motion has an average saccadic duration of approximately 200 ms. Thus, on average, video display processor 110 has approximately 188 ms to determine the destination of the field of view and to react to that information. The amount of time video display processor 110 has to react to the saccadic motion of the field of view can then be determined as a function of distance of eye motion travel within the field of view, in degrees.

Embodiments of system 100 and methods described herein may be optimized locally or remotely. "Local optimization" refers to the optimization of the transfer of data from video display processor 110 to video display 112. "Remote optimization" refers the optimization of the transfer of data over electronic network 106 between video storage processor 114 and video display processor 110. System 100 is configured to further consider a network quality metric to measure the quality of electronic network 106. The network quality metric considers multiple parameters of electronic network 106, including latency, congestion, and bit error rate. Latency, for example, includes the amount of time data takes to travel from one point in electronic network 106 to another point in electronic network 106. In an embodiment, system 100 further includes a predetermined high quality area that is the minimum area occupied by high quality rendering zone 214 on video display 112.

In further operation, system 100 is configured to engage in local optimization by changing a resolution, a frame rate, a color gamut, and a dynamic range of the video displayed in content layout 200 of video display 112 to optimize the computing resource load on video display processor 110 and video display 112 by adjusting a bit transfer requirement from video display processor 110 to video display 112. Accordingly, system 100 advantageously is able to display relatively higher resolution video, higher frame rate video, higher color gamut video, and/or higher dynamic range video within high quality rendering zone 214 (corresponding to foveal region 204) and immediately surrounding area of the field of view, while displaying relatively lower resolution video, lower frame rate video, lower color gamut video, and/or lower dynamic range video in the other zones of video display 112 without significantly reducing the quality of the viewer's visual experience. That is, high quality rendering zone 214 receives high quality renderings while medium quality rendering zone 216 and/or low quality rendering zone 218 receive lower quality renderings, respectively. Nevertheless, the foveal portion of the human eye substantially views only the high quality renderings.

In the exemplary embodiment, video display 112 is configured to display video at a rate of 120 fps in high quality rendering zone 214, while displaying video at a rate of 60 fps to the remaining areas of video display 112, such as medium quality rendering zone 216 and low quality rendering zone 218. In the exemplary embodiment, the 120 fps frame rate is selected as a multiple of the 60 fps frame rate in order to achieve frame synchronization between the respective rendering zones. As the field of view moves, their eyes view different areas of video display 112. The saccadic motion is detected by video display processor 110, and video display processor 110 changes the center (e.g., central point 211) of high quality rendering zone 214 where the high frame rate video is displayed. In the exemplary embodiment, a source video file (not shown) is stored at 120 fps. In an embodiment, video display processor 110 is further configured to downscale the frame rate to 60 fps in peripheral region 208 and/or low quality rendering zone 218.

In exemplary operation, eye tracking video camera 104 tracks the viewer's eye and transmits a video of the viewer's eye to video display processor 110. Video display processor 110 determines a first location for the field of view based on at least one frame from the images recorded by eye tracking video camera 104. Video display processor 110 then requests a video of stored image frames from video storage system 108. Video storage system 108 then transmits the video to video display processor 110. Video display processor 110 then transforms a first portion of the first received video into a first high quality video and second portion of the video into a first low quality video. Video display processor 110 then transmits the first high quality video and the first low quality video to video display 122. Video display 122 then displays the first high quality video in high quality rendering zone 214 centered on the first location and displays the first low quality video in medium quality rendering zone 216 and a low quality rendering zone 218, both also centered on the first location.

In an alternative or additional operation, video display processor 110 determines a second location for the field of view based on at least one frame from the image frames recorded by eye tracking video camera 104. Video display processor 110 may then determine a field of view destination for the second location based on, for example, at least three frames from the image frames recorded by eye tracking video camera 104. Video display processor 110 requests a video of stored image frames from video storage system 108. Video storage system 108 transmits the video of stored image frames to video display processor 110. Video display processor 110 transforms a first portion of the second received video into a second high quality video and a second portion into a second low quality video. Video display processor 110 transmits the second high quality video and the second low quality video to video display 122. Video display 122 displays the second high quality video in high quality rendering zone 214 centered on the second location and displays the second low quality video in medium quality rendering zone 216 and a low quality rendering zone 218, both centered on the second location/destination.

In an embodiment, remote optimizations further optimize the bit transfer over electronic network 106 between video storage processor 114 and video display processor 110. In an exemplary embodiment, electronic network 106 includes one or more of an intra-computer bus, a local area network, and a wide area network such as the Internet.

Referring back to FIG. 1, in an embodiment, electronic network 106 is the Internet, and video storage processor 114 is located in a data center remote from video display processor 110. In operation, video display processor 110, with eye tracking video camera 104, determines a location of the field of view on video display 112 and centers high quality rendering zone 214 (FIG. 2) about the determined location (e.g., central point 211). Video display processor 110 is configured to then request video from video storage processor 114 having the highest predetermined resolution, frame rate, color gamut, and/or dynamic range. Video storage processor 114 obtains this requested high quality video from video storage device 116 and transmits the obtained video to video display system 102 for display (e.g., within high quality rendering zone 214, FIG. 2) on video display 112. In a similar manner, lower resolution, frame rate, color gamut, dynamic range is transmitted to video display system 102 for display on video display 112 within lower resolution rendering zones (e.g., rendering zones 216, 218, FIG. 2).

In an exemplary embodiment, video display 112 is configured to display a standard range of 3840 pixels in the left to right (x) dimension, and 2160 pixels in the top to bottom dimension (y). In this example, the high quality rendering zone 214 can thus be configured to occupy 400×400 pixels at, for example, a 4K quality resolution, centered on the location of the field of view (e.g. central point 211). Further to this example, and video display processor 110 is configured to obtain the remainder of the pixel array at a lower resolution, such as 720p, for example, and map the lower resolution video to the higher resolution video. In operation, when the viewer shifts the field of view to a different part of video display 112, video display processor 110 is configured to then predict, within an optimal time period, where the field of view is shifting and re-center the higher resolution rendering zone for that relocated central point 211' on video display 112. The size of the high quality rendering zone 214 is selected in consideration of measured latency of electronic network 106, such that high quality video is delivered from video storage processor 114 and displayed on video display 112 before the field of view arrives at relocated central point 211'.

In exemplary operation, eye tracking video camera 104 tracks the viewer's eye and transmits a video of the viewer's eye to video display processor 110. Video display processor 110 determines a first location for the field of view based on at least one frame from the video recorded by eye tracking video camera 104. Video display processor 110 then requests a video of stored image frames from video storage system 108. The video of stored image frames a first portion including a first high quality video and a second portion including a first low quality video. Video storage system 108 then transmits the first high quality video and the first low quality video to video display processor 110. Video display processor 110 then transmits the first high quality video and the first low quality video to video display 122. Video display 122 then displays the first high quality video in high quality rendering zone 214 centered on the first location for the field of view and displays the first low quality video in medium quality rendering zone 216 and a low quality rendering zone 218, both also centered on the first location.

In an alternative or additional operation, video display processor 110 determines a second location for the field of view based on at least one frame from the image frames recorded by eye tracking video camera 104. Video display processor 110 may then determine a field of view destination for the second location based on, for example, at least three frames from the image frames recorded by eye tracking video camera 104. Video display processor 110 requests a video of stored image frames from video storage system 108. The video of stored image frames includes a third portion including a second high quality video and a fourth portion including a second low quality video. Video storage system 108 then transmits the second high quality video and the second low quality video to video display processor 110. Video display processor 110 then transmits the second high quality video and the second low quality video to video display 122. Video display 122 then displays the second high quality video in high quality rendering zone 214 centered on the field of view destination and displays the second low quality video in medium quality rendering zone 216 and a low quality rendering zone 218, both centered on the field of view destination.

In an exemplary operation, the size of high quality rendering zone 214 may be optimized based on the latency of electronic network 106. In this example, electronic network 106 is determined to have a latency greater than 250 ms. That is, data transmitted over electronic network 106 takes longer than 250 ms to complete a round trip from and to the video display processor. Where, for example, a saccade covers 70 degrees, and has a duration of 233 ms, the size of high quality rendering zone 214 may be optimized such that video display processor 110 has sufficient time to detect the motion of the saccade, and transmit a request to video storage processor 114 to change the focus location and/or resolution zone size. Alternatively, in a case where electronic network 106 has a latency less than 125 ms, optimization of the size of high quality rendering zone 214 may be more easily optimized with respect to, for example, a saccade covering 30 degrees with a duration of approximately 100 ms. The present embodiments are thus further advantageously able to measure the network latency, and utilize the measured latency as a parameter to set the resolution quality for the several rendering zones.

Thus, in the example above, when electronic network 106 is measured to provide a generally consistent latency of approximately 125 ms or less, high quality rendering zone 214 is sized such that system 100 may set or shift the location of high quality rendering zone 214 before the detected field of view can move outside of high quality rendering zone 214. In one embodiment, the size of high quality rendering zone 214 is set, for example, to cover up to approximately 30 degrees in any direction from central point 211. That is, high quality rendering zone 214 may include a 30 degree radius circle on video display 112 centered about central point 211, with all other areas of video display 112 designated for medium quality rendering zone 216 and/or low quality rendering zone 218. According to the exemplary embodiment, as the measured latency of electronic network 106 increases, video display processor 100 correspondingly reduces the size of high quality rendering zone 214. Accordingly, system 100 is further advantageously configurable to dynamically react to the measured latency of electronic network 106 by increasing or decreasing the size of high quality rendering zone 214.

In general, human eye motion is considered to be faster than human head, neck, or body motions. According to an alternative embodiment, the systems and methods described herein are implemented for video displays 112 including a plurality of surrounding screens (as opposed to a wearable viewscreen) that includes up to a 360 degree panorama in the horizontal and/or vertical directions. Referring to the previous example, in this alternative embodiment, video display processor 110 may set the size of high quality rendering zone 214 to be smaller than 30 degrees, since the human head viewing a 360 degree panorama (or smaller) will not move as quickly as the human eye, and thus system 100 will not generally have to respond as quickly to relocate central point 211 as it would have to based on saccadic eye motion alone.

Referring again to FIG. 1, a process 300 of optimizing video delivery based upon saccadic eye motion is also illustrated. Process 300 includes a detecting step 302, using eye tracking video camera 104, a field of view of at least one eye of the viewer, and thereby transmitting video display coordinates from the detected field of view to a video display processor 110. An identifying step 304 identifies a region on video display 112 corresponding to the transmitted video display coordinates and then further requesting, by video display processor 110, the immersive content from video storage processor 114 at a first resolution (not separately numbered) for a first portion of the immersive content and a second resolution (not separately numbered) for a second portion of the immersive content. In this exemplary process, the first resolution is higher than the second resolution. For example, the first resolution may represent a high quality image rendering, such as 4k, and the second resolution may represent a relatively lower quality image rendering, as discussed above. Additionally, a third resolution, lower than the second resolution, may be implemented, for example, with respect to the outer peripheral region 208 or low quality rendering zone 218.

Process 300 then proceeds to a receiving step 306, where video display processor 110 receives the first portion of the immersive content at the first resolution and the second portion of the immersive content at the second resolution, and then centers the corresponding display of the first and second portions of the immersive content about central point 211 of the region identified in step 304. In step 308, process 300 displays the centered corresponding first portion of the immersive content on video display 112 within a zone of the video display including central point 211, and displays the centered corresponding second portion of the immersive content on video display 112 outside of the zone occupied by the first portion of the immersive content. According to these advantageous processing embodiments, the data volume of the combined first and second video portions is significantly lower than a data volume if both the first and second portions were rendered at the same higher resolution. By utilizing measured saccadic eye motion data, alone or together with other parameters such as network latency, the present embodiments are able to significantly reduce the quantity of data transmitted, and also the time to render the data on a display, in virtual reality applications without significantly reducing the quality of the content experienced by the viewer.

Exemplary embodiments of immersive video systems and methods are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for displaying an immersive video content according to eye movement of a viewer, comprising:
   detecting, using an eye tracking device and a processor, saccadic movement of at least one eye of the viewer viewing a display device;
   predicting, using the processor, a future field of view of the viewer based at least in part on the saccadic movement;
   obtaining, from a video storage device via a communication network outside of a local network which is between the video storage device and the display device, first immersive video content corresponding to the future field of view;
   displaying the first immersive video content in a first zone of the display device, the first zone corresponding to the future field of view; and
   determining a size of the first zone at least partially based on a latency of the communication network outside of the local network which is between the video storage device and the display device such that the first immersive video content is displayed in the first zone before the at least one eye of the viewer arrives at the first zone.

2. The method of claim 1, further comprising adapting streaming delivery of immersive video content according to a network quality metric.

3. The method of claim 2, where the network quality metric includes one or more of network latency, network congestion, and network bit error rate.

4. The method of claim 1, further comprising adapting immersive video content to have (i) a first quality level for a first portion of the immersive video content and a (ii) second quality level for a second portion of the immersive video content, the first quality level being different from the second quality level.

5. The method of claim 4, further comprising:
   displaying the first portion of the immersive video content in the first zone of the display device; and
   displaying the second portion of the immersive video content in a second zone of the display device outside of the first zone.

6. The method of claim 5, wherein:
   the first quality level comprises at least one of a first image resolution, a first image frame rate, a first image color gamut, and a first image dynamic range; and
   the second quality level comprises at least one of a second image resolution, a second image frame rate, a second image color gamut, and a second image dynamic range.

7. The method of claim 5, further comprising determining a size of the first zone at least partially based on a gaze area value.

8. The method of claim 5, further comprising:
   displaying the first portion of the immersive video content in the first zone of the display device at a first frame rate; and
   displaying the second portion of the immersive video content in the second zone of the display device at a second frame rate, the first frame rate being an integer multiple of the second frame rate.

9. The method of claim 5, further comprising centering the first and second zones about a central point in the future field of view.

10. A system for displaying an immersive video content to a viewer, comprising:
    a video display;
    an eye tracking device configured to detect saccadic movement of at least one eye of the viewer; and
    a processor configured to:
      predict a future field of view of the viewer based at least in part on the saccadic movement,
      obtain, from a video storage device via a communication network outside of a local network which is between the video storage device and the video display, first immersive video content corresponding to the future field of view,
      display the first immersive video content in a first zone of the video display, the first zone corresponding to the future field of view, and
      determine a size of the first zone at least partially based on a latency of the communication network outside of the local network which is between the video storage device and the video display such that the first immersive video content is displayed in the first zone before the at least one eye of the viewer arrives at the first zone.

11. The system of claim 10, wherein the video display and the eye tracking device are integrally included within a single device.

12. The system of claim 10, further comprising the video storage device.

13. The system of claim 10, where the processor is further configured to adapt streaming delivery of immersive video content according to a network quality metric.

14. The system of claim 10, wherein the processor is further configured to adapt immersive video content to have (i) a first quality level for a first portion of the immersive video content and a (ii) second quality level for a second portion of the immersive video content, the first quality level being different from the second quality level.

15. The system of claim 14, wherein the processor and the video display are collectively configured to:
    display the first portion of the immersive video content in the first zone of the video display; and
    display the second portion of the immersive video content in a second zone of the video display outside of the first zone.

16. The system of claim 15, wherein:
    the first quality level comprises at least one of a first image resolution, a first image frame rate, a first image color gamut, and a first image dynamic range; and
    the second quality level comprises at least one of a second image resolution, a second image frame rate, a second image color gamut, and a second image dynamic range.

17. The system of claim 15, wherein the processor is further configured to determine a size of the first zone at least partially based on a gaze area value.

18. The system of claim 15, wherein the processor and the video display are collectively configured to:
    display the first portion of the immersive video content in the first zone of the video display at a first frame rate; and
    display the second portion of the immersive video content in the second zone of the video display at a second frame rate, the first frame rate being an integer multiple of the second frame rate.

19. The system of claim 15, wherein the processor and the video display are collectively configured to center the first and second zones about a central point in the field of view.

* * * * *